United States Patent [19]

Halfhill et al.

[11] E Re. 30,118

[45] Reissued Oct. 16, 1979

[54] DISC DRIVE LINEAR ACTUATOR AND CONTROL SYSTEM THEREFOR

[75] Inventors: Martin O. Halfhill, San Jose; Russell K. Brunner, Santa Clara, both of Calif.

[73] Assignee: Xerox Corporation, Stamford, Conn.

[21] Appl. No.: 853,662

[22] Filed: Nov. 21, 1977

Related U.S. Patent Documents

Reissue of:

[64] Patent No.: 3,922,718
Issued: Nov. 25, 1975
Appl. No.: 486,408
Filed: Jul. 8, 1974

[51] Int. Cl.[2] ..... G11B 21/08; G11B 5/55

[52] U.S. Cl. ..... 360/78; 360/106

[58] Field of Search ..... 360/78, 106

[56] References Cited

U.S. PATENT DOCUMENTS

| | | | |
|---|---|---|---|
| 3,643,242 | 2/1972 | Bryer | 360/106 |
| 3,721,967 | 3/1973 | Englert et al. | 360/78 |
| 4,012,778 | 3/1977 | Johnson | 360/78 |
| 4,012,779 | 3/1977 | Brunner | 360/78 |
| 4,012,780 | 3/1977 | Johnson | 360/78 |

*Primary Examiner*—Robert S. Tupper
*Attorney, Agent, or Firm*—Barry Paul Smith

[57] ABSTRACT

A disc drive memory device is described utilizing a continuously rotating drive shaft and a roller which rides thereon to effect translational motion of a carriage to move a read/write head between address locations on a magnetic recording surface of a data storage disc.

30 Claims, 11 Drawing Figures

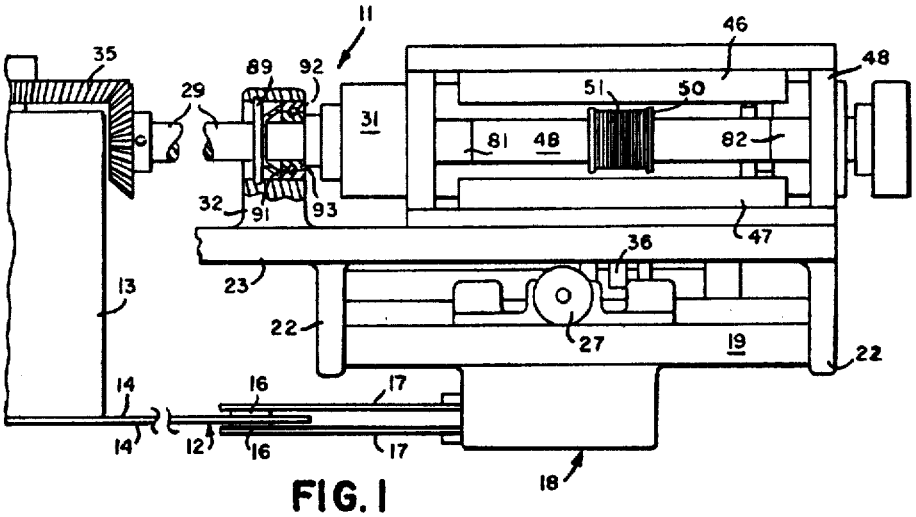
FIG. 1
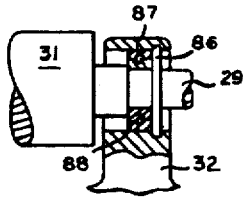
FIG. 7
FIG. 2
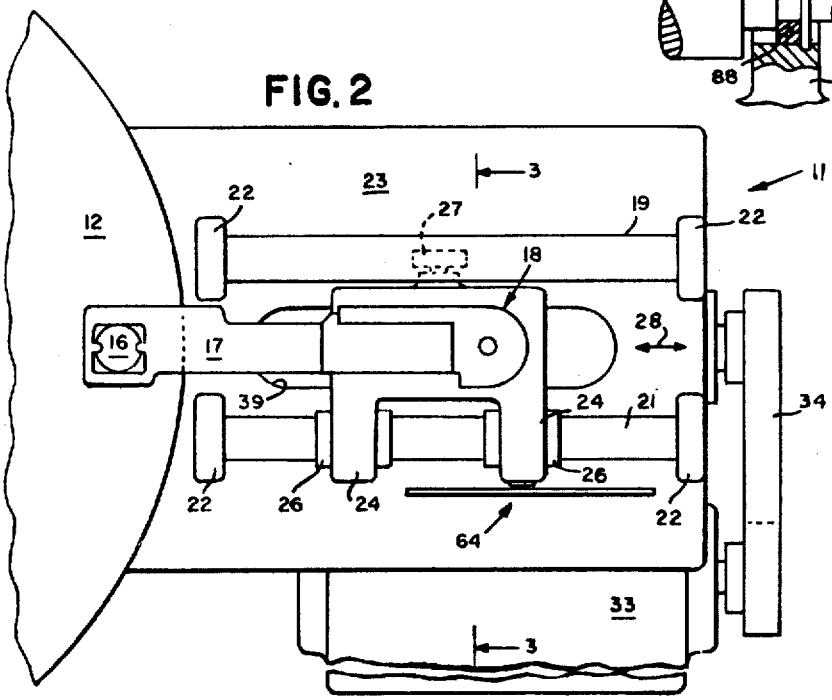

FIG. 3
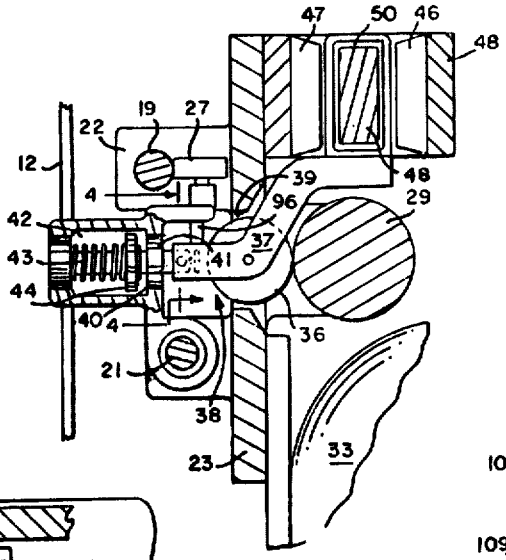
FIG. 9
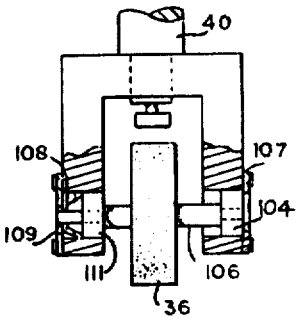
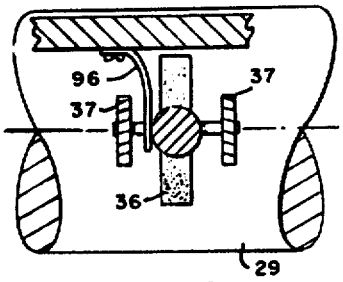
FIG. 4
FIG. 8
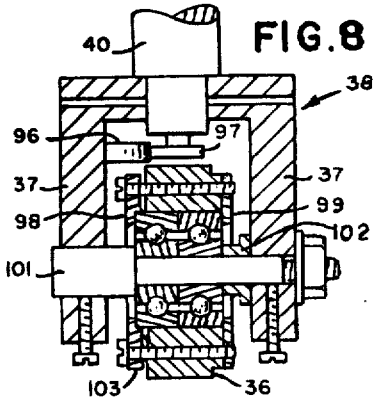
FIG. 5
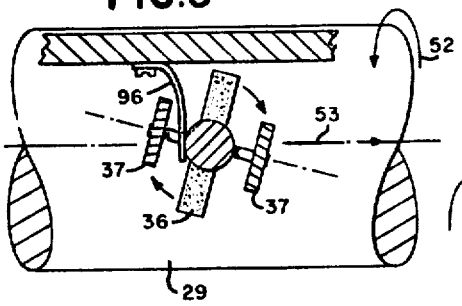
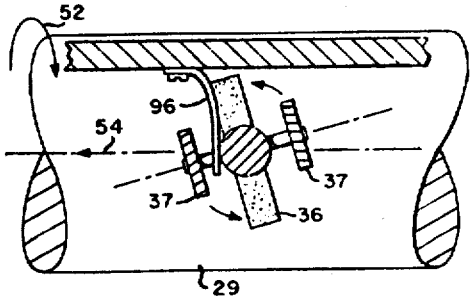
FIG. 6

FIG. 10
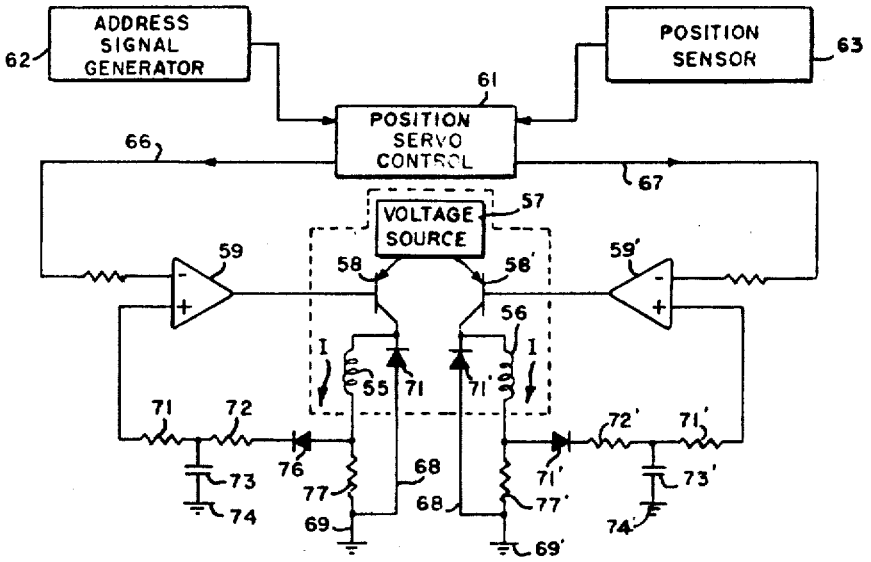
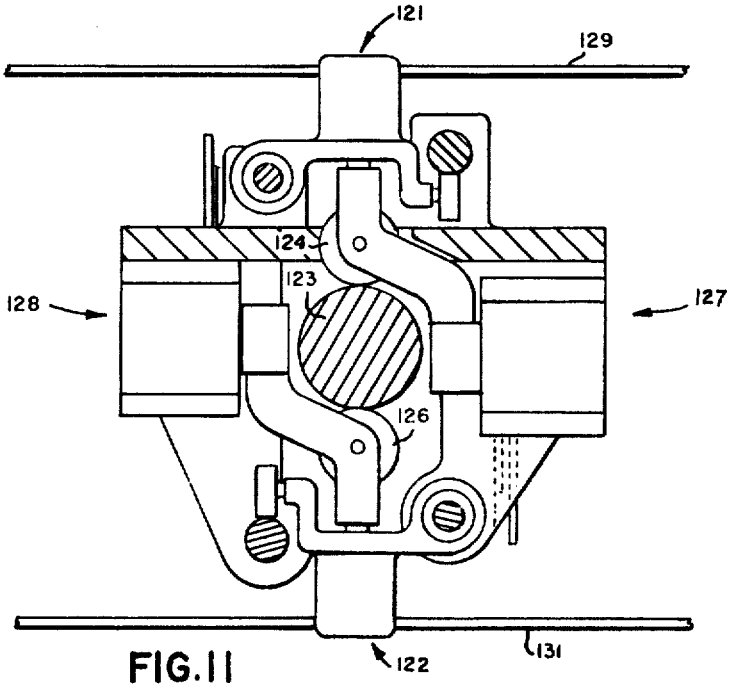
FIG. 11

DISC DRIVE LINEAR ACTUATOR AND CONTROL SYSTEM THEREFOR

Matter enclosed in heavy brackets [ ] appears in the original patent but forms no part of this reissue specification; matter printed in italics indicates the additions made by reissue.

BACKGROUND OF THE INVENTION

The present invention relates to a linear actuator for a random access memory apparatus or the like and, more particularly, to such a linear actuator which provides highly accurate and fast positioning of a data transfer head with respect to a disc recording surface.

Direct access memories of the type employing one or more magnetic discs for recording and storing data are widely used as peripheral memories for computers and other data processing units. Memories of this nature have the advantage of enabling information to be either transferred to, or removed from, randomly selected address locations or tracks on the disc without the necessity of the memory having to serially seek the desired location as is necessary, for example, when magnetic tape memories are employed.

The read/write recording head or other data transfer device associated with each disc recording surface for transferring data to and from such surface is typically movable translationally with respect to the disc between the various address locations. It will be recognized the speed at which data can be applied or recognized that from a disc will depend in a large measure on the speed with which the transfer head is movable between various ones of the locations. It is also necessary that the transfer head be quite accurately positioned with respect to each address location, not only to assure that data is either applied to or removed from the proper address, but to enable address locations to be closely spaced to one another to provide adequate storage capacity on the disc surface.

Typically, the transfer head or heads are mounted on a carriage which is, in turn, mounted upon a track for travel on a translational path which will provide the desired movement of the heads between the radially spaced address locations. The carriage can be driven by various mechanisms, the most satisfactory of which to date is basically a voice coil, i.e., a solenoid of the type used to drive an audio speaker. While linear actuators of this type have been generally satisfactory, they do have certain disadvantages. For one, it will be appreciated that every time it is desired to move a transfer head and, hence, the carriage supporting the same, it is necessary that the momentum of the carriage be changed from essentially zero to a high value in a very short time in order to achieve a realistic access time. The electrical power required to cause a voice coil to provide the accelerations required is of a high order of magnitude. Moreover, a voice coil actuator is relatively inefficient in terms of the amount of electrical power that must be delivered to it relative to the mechanical power output. Also, complicated drive and control circuitry has been required to provide the necessary power and yet enable quite accurate positioning of the head or heads at address locations.

SUMMARY OF THE INVENTION

The present invention provides a linear actuator which is capable of providing highly accurate and fast positioning of a transfer head with respect to a record surface of a magnetic recording disc without the high electrical power requirements of more conventional arrangements. It further includes a power drive circuit for such a linear actuator which is quite simple and yet substantially reduces the amount of power required to control the positioning of a transfer head carriage.

In its basic aspects, a random access memory apparatus which includes the linear actuator of the invention has, as is typical, a carriage on which the transfer head or heads are mounted and a track on which the carriage is mounted for travel on a translational path providing movement of the transfer head between radially spaced address locations on a recording disc. In addition, it includes a drive shaft having a cylindrical peripheral surface and a support mounting such drive shaft for rotation about the axis of such cylindrical surface. The drive shaft is oriented with its axis generally parallel to the translational path that the carriage travels; and a power source, such as a motor, is provided for rotating the drive shaft about the axis of such cylindrical surface. Coupling means are also provided for converting the rotary motion of the drive shaft into translational motion of the carriage. Such coupling means includes a roller, and means carried by the carriage for supporting the roller and maintaining the same in frictional engagement with the cylindrical surface of the drive shaft. Rotation of the drive shaft will therefore cause the roller to be simiarly rotated.

Roller control means are provided for selectively changing the angular orientation of the axis of rotation of the roller with respect to the axis of rotation of the cylindrical surface. That is, the roller control means acts to turn the axis of the roller relative to the axis of the drive shaft cylindrical surface between an orientation in which such axes are parallel to one another and one or more in which they are oblique with respect to one another. It will be recognized that when the axes are parallel to one another, the roller will trace a path on the drive shaft which is in a plane normal to the drive shaft's axis. However, when the axis of the roller is oblique with respect to the axis of rotation of the cylindrical surface, the roller will trace, assuming a good frictional engagement between the roller and the cylindrical surface, a helix along the cylindrical surface. That is, the roller will not only be rotated by the drive shaft, but it will also be moved translationally with respect thereto in a direction parallel to the drive shaft's axis of rotation. Since the roller is carried by the carriage, the carriage will also be moved translationally.

It will be appreciated from the above that a desired translational motion of the carriage can be obtained merely by varying the angle between the axis of rotation of the roller and the axis of rotation of the drive shaft. More particularly, the power of the rotating drive shaft is transmitted through the roller to the carriage to cause translational movement of the latter whenever the angular orientation of the axis of the roller is oblique with respect to the axis of the drive shaft. Because the drive shaft continuously rotates, it is not necessary to accelerate the power source itself, i.e., the drive shaft, from zero momentum to a high momentum each time it is desired to move the carriage. Moreover, neglecting friction losses, all of the power extracted by the carriage from the drive shaft is converted into carriage acceleration. The high electrical driving power required by conventional linear actuators is therefore not needed.

The apparatus further includes a position sensor for determining the position at any given time of the transfer head relative to a desired address location. A position servo system responds to a difference between the desired and actual position of the head by regulating the roller control means to make a corresponding adjustment in the angular orientation of the roller axis to cause the carrige to move in a direction moving the transfer head to the desired address location. As another salient feature of the invention, the position servo system includes a power drive circuit which minimizes the power required to change the axis of rotation of the roller. In this connection, the interaction of a magnetic field developed by an induction coil with another magnetic field is used to develop the force which changes the angular orientation of the roller axis. In its basic aspects, the power drive circuit includes a power source connected to the induction coil through a first switch which is responsive to receipt of a control signal by applying power from the power source to the coil. A second switch is provided which is responsive to receipt of an information signal indicating a difference between the position desired for a transfer head and its actual position by generating a control signal for application to the first switch which is pulsed to alternately switch ON and OFF the application of power from the source to the coil. The time delay between pulses of the pulse control signal is selected to be shorter than the decay time for current in the coil, and means are provided for continuing current flow through the coil between pulses. The result is that the coil will remain energized during the full duration of an information signal, even though the first switch is discontinuously operating during such duration. The continuous energization of the coil by a discontinuous application of power thereto will provide a significant power saving.

The invention includes many other features which are important and will be described in more detail hereinafter. For one, an especially compact drive apparatus can be provided for two or more separate discs or disc packs by driving a plurality of carriages from a single drive shaft. That is, the rollers of a plurality of carriages are made to frictionally engage the same drive shaft for independent driving. Other features of the invention, some of which are independently usable in linear actuators designed for machines other than disc pack drives, will be described or will become apparent from the following more detailed description of the preferred embodiments.

BRIEF DESCRIPTION OF THE DRAWINGS

With reference to the accompanying three sheets of drawing:

FIG. 1 is a partial and broken side elevation view illustrating the pertinent portions of a preferred embodiment of a random access memory apparatus incorporating the invention;

FIG. 2 is a plan view view of the apparatus of FIG. 1;

FIG. 3 is a sectional view taken generally on a plane indicated by the lines 3—3 in FIG. 2 and illustrating details of the apparatus;

FIG. 4 is a sectional view taken on a plane indicated by the lines 4—4 in FIG. 3 illustrating details of the roller mechanism;

FIGS. 5 and 6 are views similar to FIG. 4 illustrating different orientations of the roller with respect to the drive shaft;

FIG. 7 is a partial sectional view illustrating details of the mounting of the drive shaft;

FIG. 8 is an enlarged sectional view illustrating details of the mounting of the roller;

FIG. 9 is an enlarged sectional view similar to FIG. 8 illustrating an alternate mounting of the roller with respect to the remainder of the carriage;

FIG. 10 is a schematic electrical diagram of the power drive circuit of the invention; and FIG. 11 is a sectional view somewhat similar to FIG. 3 illustrating another preferred embodiment of the invention.

DETAILED DESCRIPTION OF PREFERRED EMBODIMENTS

With reference first to FIG. 1, the pertinent portion 11 of a recording disc drive apparatus is illustrated. Such apparatus includes a recording disc 12 mounted axially on a spindle 13 for rotation therewith. The opposite planar surfaces 14 of the disc 12 are coated with a magnetically recordable material making the same into data storage record surfaces.

Associated with each record surface 14 is a data transfer device in the form of a read/write head 16. As illustrated, each of the heads 16 is supported via a cantilevered arm 17 extending from a carriage which is generally referred to by the reference numeral 18. The carriage 18 is, in turn, mounted for travel back and forth on a translational path defined by a track. In general, the track consists of a pair of spaced apart guide rails 19 and 21 (FIG. 2) which are mounted on opposite sides of the carriage via end flanges 22 which, in turn, project from a stationary baseplate 23. Although the details of the track will be discussed in more detail hereinafter, it will be seen from FIG. 2 that the carriage includes a pair of bearing projections 24 which are slidably received via sleeve bearings 26 on the rail 21 at positions which are spaced a substantial distance apart to provide stability. On the opposite side of the carriage, a support roller 27 is maintained in engagement as will be discussed with the rail 19. The result is that the carriage is supported on its opposite sides for movement back and forth on a translational path indicated by the arrow 28 (FIG. 2). Such movement will result in the read/write heads 16 being translationally moved across their associated disc record surfaces between radially spaced address locations.

As mentioned previously, the access speed of a disc type storage device is dependent in a major way on the speed with which the carriage can move the head 16 between address locations. Drives provided in the past for effecting the carriage movement have, in general, certain deficiencies. For one, in moving the carriage from one essentially stationary location to another, it is necessary that a high power input be initially delivered to the drive mechanism in order to overcome both its own inertia and that of the carriage. Moreover, most have not been able to provide the accuracy which is desired for locating and maintaining the heads at a particular location with respect to the record surfaces. As a particularly salient feature of the instant invention, it includes a linear actuator for driving the carriage which substantially alleviates such problems. The mechanical power for moving the carriage is provided by a drive shaft 29 which has a cylindrical peripheral surface 31 and is mounted for rotation about the axis of such cylindrical surface. More particularly, a pair of spaced apart uprights 32 project upwardly from the baseplate 23 on the side thereof opposite the carriage 18 and rotatably receive the shaft 29. As illustrated, the drive shaft 29 is supported with its axis of rotation generally parallel to the rails 19 and 21, and hence, parallel to the translational path of the carriage.

Motive power means are connected to the drive shaft 29 for rotating the same about its axis. That is, an electric motor 33 is also mounted to the baseplate 23 on the same side thereof as the shaft 29. As is best shown in FIG. 2, the drive shaft of the motor is drivingly connected via suitable pulleys (not visible) and a drive belt 34 with one end of the shaft 29. The motor 33 is therefore arranged to rotatably drive such shaft.

The rotary motion of the drive shaft 29 is also usable to drive the spindle 13 and, hence, rotate the recording disc 12. More particularly, as illustrated in FIG. 1, the drive shaft is connected through a bevel gear train 35 to the shaft for such rotation. Thus, the single power source represented by the motor 33 can be used to perform two functions, i.e., both drive the carriage and to rotate the recording disc.

Coupling means are provided for converting rotary motion of the drive shaft into translational motion of the carriage. As is best illustrated in FIG. 3, for this purpose a roller 36 mounted for rotation between the legs 37 of a yoke 38 is maintained in frictional engagement with the cylindrical surface of the drive shaft. The roller 36 is positioned within an elongated slot 39 extending through the baseplate 23, and a support rod 40 is rigidly secured to the base end of the yoke. As is shown, the rod 40 is journalled for rotation within the plate 41 (FIG. 3) of the carriage about an axis which passes through the center of rotation of the roller 36. The rod 40 passes beyond the plate 41 into a chamber 42 of the carriage wherein a coiled compression spring 43 axially surrounding the end of the rod bears against a thrust bearing 44 thereon to resiliently urge the rod and, hence, the roller 36 toward the drive shaft 29. Spring 43 is selected to not only provide sufficient force to maintain the wheel 36 in engagement with the drive shaft with the frictional force necessary for the acceleration desired as will be described, but also to urge the carriage 18 pivotally about the guide rail 21 to maintain the carriage roller 27 in engagement with the rail 19 which acts, in effect, as a transverse restraint rail. Thus, the means for maintaining the roller 36 in engagement with the drive shaft 29 also forms a part of the structure defining the relationship between the carriage and its track.

Control means are provided for selectively changing the angular orientation of the roller's axis of orientation. In this connection, as best illustrated in FIG. 3, the legs 37 of the roller yoke 38 extend beyond the roller and are angled outward to be clear of the drive shaft 29. Such legs form, in effect, a lever arm 45 which extends in a direction having a component transverse to the axis of the support rod 40. Thus, pivoting of such arm about the axis of the rod 40 will result in changing the angular orientation of the axis of rotation of the roller 36.

The interaction of magnetic fields are used to pivot the lever arm and thereby change the angle or orientation of the roller axis. More particularly, a pair of spaced apart permament magnets 46 and 47 are supported on opposite sides of an elongated, soft iron magnetic core 48, all of which are supported by a frame 49 secured to the baseplate adjacent drive shaft 29. The free end of the lever arm 45 has a bobbin 50 which axially surrounds the core 48 secured thereto, and an induction coil arrangement 51 is wrapped around the bobbin.

The lever arm 45 will travel translationally of the drive shaft with the roller 36, and the induction coil arrangement 51 provides means for generating a first magnetic field at a location on such lever arm spaced from the roller. The permament magnets generate a second magnetic field along the path travelled by the coil arrangement upon translational motion of the roller. The permanent magnets are chosen relative to the power with which the coil arrangement 51 will be excited to apply sufficient force to the lever to pivot the same as necessary to cause the desired pivoting of the roller axis. In this connection, a sufficient gap must exist between the bobbin 50 and the iron core 48 to permit the bobbin to pivot with the lever a desired amount without binding. It will be recognized that the direction of current flow in the coil arrangement will control the direction of the magnetic field produced by the coil relative to that produced by the permanent magnets and, hence, the direction of the force applied to the lever. Thus, control of the direction of current flow in the coil arrangement will provide control of the direction and speed of the carriage on its translational path.

FIGS. 4–6 illustrate differing relationships of the roller to the shaft providing carriage translation. FIG. 4 first shows the axis of the roller parallel to the axis of the peripheral surface of the drive shaft. It will be recognized that as the shaft rotates, the roller will be caused to rotate because of its frictional engagement therewith. The roller will not be moved translationally, however, but will merely continuously travel over a circular path on the surface of the drive shaft, the plane of such path being normal to both the axis of the drive shaft and the axis of the roller. FIG. 5 shows the roller turned clockwise so that its axis is now oblique to that of the drive shaft's peripheral surface. The roller will now describe a helical path on the surface of the shaft. Assuming the shaft is rotating in the direction indicated by arrow 52, the roller and, hence, the carriage, will be move translationally in the direction indicated by arrow 53. FIG. 6 illustrates the roller turned counterclockwise. With the shaft continuing to rotate in the direction indicated by arrow 52, the roller and the carriage will be now translationally moved in the direction indicated by the arrow 54.

As another salient feature of the invention, it includes a power drive circuit for energizing the coil arrangement 51 in a manner minimizing the amount of power required for such energization. Reference is made to FIG. 10 for a detailed description of such power drive circuit. The coil arrangement 51 is actually made up of two separate induction coils represented in FIG. 10 at 55 and 56. The power drive circuit is arranged to separately energize each of the coils 55 and 56 in opposite directions. In this connection, the circuitry for energizing each is basically a duplication of that for energizing the other. Such circuitry will be described in detail only, therefore, in connection with energization of the coil 55.

As illustrated, a power voltage source as represented at 57 is connected through a saturating power transistor driver 58 with the coil 55. The transistor driver 58 acts, in effect, as a switch which responds to receipt of a control signal by applying power from the power source to the coil. That is, the application of an appropriate signal to its base will result in its saturation and a consequent flow of power from the power source 57 through the coil 54.

Operation of the transistor 58 is controlled by a high gain operational amplifier 59. The inverting input of the amplifier 59 is connected to the output of a position servo control 61. The output generated by the servo control 61 is indicative at any time of the difference between the actual position of the transfer head and the desired address location therefor. In this connection, such position servo control receives input as to a desired address location as schematically indicated by the address signal generator 62. It also receives an input from a position sensor 63 which can be, for example, a position transducer 64 (FIG. 2) of a type commonly used. The position servo control compares the signals received from the address signal generator and the position sensor and responds to a difference by issuing a position information signal indicative of the difference and applying it either on line 66 or 67 depending upon the direction the carriage must travel to reach a desired address location.

The coil 55 is connected in series with the output of the driver 58 in a feedback connection to the non-inverting input of the amplifier 59. This arrangement will result in the output of the amplifier 59 applied to the base of the transistor 58 being a pulse control signal whenever the information signal on line 66 indicates a difference between an actual position of the carriage and a desired position. That is, when an information signal first appears at the inverting terminal of the amplifier 59, the transistor will be turned ON to apply the potential supplied by source 57 through coil 55. Such potential will be applied to the non-inverting terminal of the high gain amplifier because of the feedback connection. When the potential applied to the non-inverting terminal becomes equal to the potential of the position information signal potential, the output of the amplifier will be turned OFF, with the result that the potential at the non-inverting input terminal of the amplifier 59 will again differ from the information position signal, and the amplifier 59 will again be turned ON to thereby again also turn ON driver 58. The high gain amplifier 59 will thus be responsive to receipt of an information signal by generating a pulse control signal for application to the driver to alternately switch ON and OFF the application from the source 57 to the coil 55.

Means are provided to continue current flow through the coil 55 between pulses, i.e., when the transistor driver 58 is OFF during an information signal. More particularly, a path 68 for such current flow is provided between ground represented at 69 and the input end of the coil 55. A diode 71 is inserted in the path 68 to limit the back emf applied to the collector of the driver 58 whenever such driver is OFF between pulses.

It will be appreciated that with this arrangement, the coil 55 will remain energized during the full duration of any information signal on the amplifier 59 even through the driver 58 is discontinuously operated during such duration. In this connection, the time delay between pulses of the pulse control signal is selected to be shorter than the decay time for current is such coil. Means are included in the feedback connection for setting the repetition rate at which the amplifier 59 provides the pulses of the control signal. More particularly, a resistance divider network made up of a pair of resistances 71 and 72 having their common connection connected through a capacitance 73 to ground as indicated at 74 is included in the feedback circuit. The value of the resistances and the capacitance 73 are chosen relative to the L/R time constant of the coil 55 to provide both a repetition rate and current pulse width which assures full and constant energization of the coil.

The acceleration of the carriage will depend on the angular velocity at which the roller 36 is pivoting at any given time. Thus, once a desired carriage acceleration is achieved, energization of the coil can be terminated. Because of the angular relationship of the roller 36 to the axis of the drive shaft at such time, however, the velocity of the carriage will be maintained. A further power savings in the control circuitry is therefore achievable.

It will be recognized that because the roller 36 frictionally engages the drive shaft 29, the frictional resistance to reorientation of the roller's axis relative to the axis of the drive shaft must be overcome each time the roller is reoriented. Means are provided for maintaining a current flow through the coil at all times to reduce or remove, as desired, the effect of this "deadband" on the operation of the positioning mechanism. More particularly, a forward biased diode 76 is included in the feedback connection having its input also connected through a resistance 77 with ground as represented at 69. By selecting the diode and the resistance to provide a diode voltage drop which equals the current which must flow through the coil to overcome the friction times the value of the resistance 77, the deadband will be removed. It will be appreciated, however, that in those instances in which the deadband is of no consequence, the diode 76 need not be provided. Moreover, a divider network can be substituted for the diode 76 to perform the function of eliminating or reducing the deadband characteristics.

From the above, it will be seen that whenever an information signal indicating that the carriage must move in the direction represented by the coil 55 is applied to the switch represented by the amplifier 59, the coil will be energized for the duration of such signal to cause the lever arm 46 to be pivoted in the proper direction to cause the carriage to move translationally to the desired address location.

If it is necessary that the carriage move in the opposite direction to reach the address location, the output from the position servo control will be directed on line 67 to high gain amplifier 59' which is the duplicate of amplifier 59. Such amplifier will switch ON and OFF transistor driver 58' to drive the coil 56 in the same manner as coil 55 is driven. As mentioned before, the circuitry for driving coil 56 is the same as that described for driving the coil 55, and will not be described in detail. Primed reference numerals, however, are used to indicate like components.

Pulse driving of the power transistor and each of the induction coils will result in substantially less power being dissipated to drive the coil. Moreover, the simplicity and inexpensiveness of the electronics of the instant circuit relative to bridge type circuits used in the past to drive carriages of random access memory devices should be readily apparent. It will be appreciated that although for a further minimization of the total power dissipated, a pair of power drivers 58 and 58' are used to drive two separate coils 55 and 56, an inverter could be used to enable one power driver and coil to be employed in the circuitry to obtain movement of the carriage in both directions.

As another salient feature of the invention, a simple and yet highly effective means is provided for preventing translational travel of the carriage with respect to the drive shaft beyond desired limits. More particularly, as is best illustrated in FIG. 1, a pair of resilient cushioning bumpers 81 and 82 are provided at opposite ends of the path of travel of the free end of the lever arm 46. Upon the carriage approaching the limit of its travel in either direction, the lever arm will engage a bumper and be pivoted in a direction resulting in the roller 36 being oriented transverse to the axis of the drive shaft as illustrated in FIG. 4. Thus, the conversion of the rotary motion of the drive shaft 21 into translational motion of the carriage will be arrested. This safety limit on the travel of the carriage is obtained without the necessity of including an impact bumper or the like to absorb the momentum of the carriage itself. That is, merely by properly positioning the stops in the path of the lever as aforesaid, the continuous rotation of the drive shaft is used to automatically stop the carriage.

It is quite important in a disc drive memory apparatus that the transfer heads be quite precisely located with respect to the record surface on the disc. It is the relationship of the carriage 18 to its track which provides the desired exact positioning of the heads in the direction transverse to the carriage paths of travel. More particularly, at the time of manufacture the guide rail 21 is carefully aligned parallel to the desired translational path of the carriage and rigidly fixed thereto. Because this is the only portion of the track which restrains movement transverse to such path, the placement of the guide rail relative to the desired path is the only substantial critical portion of the manufacturing operation. The mounting of the carriage slideably on the guide rail at positions spaced a substantial distance from one another along the direction of the translational path provides stability for the carriage in such direction.

The apparatus includes several areas which could provide inaccuracies in the positioning of the carriage in the direction of the carriage translational path. As another salient feature of the invention, it includes means for preventing such inaccuracies. For one, the apparatus includes means for taking up play between the drive shaft 29 and its supports in the direction of the drive shaft axis. More particularly, as shown in FIG. 7, a keeper washer 86 is held in location by being seated within an annular groove in the bore through which the drive shaft 29 extends in the support standard 32. The bearing 87 for the shaft is sandwiched between a shoulder 88 on the shaft and the keeper ring 86.

Resilient spring means are provided for urging the drive shaft against the keeper ring 86. That is, as shown in FIG. 1, a second keeper ring 89 is provided within an annular groove in the bore of the other support standard 32 to maintain a compression spring 91 in engagement with the bearing 92 associated with such standard. As illustrated, such bearing bears against a shoulder 93 on the drive shaft to thereby impart the compression force of the spring to such drive shaft.

It will be seen from the above that the compression spring 91 will act to urge the drive shaft to the right as viewed in FIG. 1 in the direction of the axis of rotation of the cylindrical surface to thereby take up any play in the direction of such axis. It is important that the compressive force provided by the spring 91 be greater than the largest frictional force along the axis of rotation expected between the cylindrical surface and the roller. That is, the force provided by the compression spring must be greater than the reaction force on the drive shaft to the left when the carriage is moving with its greatest acceleration to the right as viewed in FIG. 1. Any reaction force on the drive shaft to the right will be opposed by the keeper ring 86. The above construction, therefore, will prevent unintended translational motion of the drive shaft and its cylindrical surface in the direction of the drive shaft's axis.

Means are also provided for taking up play between the roller 36 which engages the drive shaft, and its carriage. More particularly, spring means in the form of a leaf spring 96 (FIGS. 3, 4 and 8) are mounted on the carriage and bear against a ball bearing 97 associated with the yoke 38. The leaf spring is positioned to resiliently urge the yoke, and, hence the roller 36 is supported by such yoke in one direction along the axis of rotation of the drive shaft. Again, the force provided by the leaf spring 96 must be greater than the component of the frictional force along such path between the roller and the drive shaft when the carriage is undergoing its greatest acceleration.

Means are also provided for preventing axial movement of the roller with respect to its yoke along the translational path. That is, as can be seen from FIG. 8, the roller 36 is mounted on its axle via a duplexed pair of ball bearings 98 and 99. As is illustrated, the inner races of the bearings are sandwiched between the shoulder of an enlarged end 101 of the roller axle and a spacer collar 102 on such axle, and the upper races are clamped within the roller by an annular side plate 103. As is known, such an arrangement will prevent axial movement of the roller along the axle.

FIG. 9 illustrates an alternate embodiment of means for preventing axial movement of the roller with respect to the yoke. In this arrangement, the right-hand bearing 104 for the roller axle 106 is prevented from moving to the right by a keeper washer 107, and a compression spring is maintained by a keeper washer 109 resiliently urging the bearing 111 and, hence, the axle against which it abutts, also to the right. This arrangement is basically the same arrangement as that provided for taking up slack in the drive shaft, and, again, the compressive force provided by the spring 108 must be greater than the component along the axis of the axle 106 of any frictional force between the roller and the drive shaft tending to move the roller to the left as viewed in the drawing.

The above described construction for taking up play or otherwise preventing relative movement will assure that the precise positioning of the heads along the translational path of the carriage will not be affected by play in the drive mechanism. They are therefore important in assuring that the drive mechanism of the invention is capable of accurately locating the transfer heads at address locations on record surfaces with the accuracy required in modern disc drive storage devices.

The linear actuator of the invention readily lends itself to providing translational motion separately to two or more different carriages. Reference is made to FIG. 11 which illustrates a preferred embodiment of a construction for separately driving two carriages. More particularly, a pair of carriages 121 and 122 are shown on opposite sides of a single drive shaft 123. Each of the carriages 121 and 122 is respectively provided with a roller 124 and 126 in engagement with the drive shaft, and includes roller control means, generally referred to by the reference numerals 127 and 128, for selectively changing the annular orientation of the axis of rotation of each of the rollers independently of the angular orientation of the other. Each of the carriages 121 and 122 carries a transfer head (not shown) for translational motion between different address locations on respective data storage discs 129 and 131. The mechanism and power driver circuitry for each of the carriages is the same as that described for the single carriage embodiment. Because of this, the individual parts of each of the carriages are referred to by the same reference numerals utilized with the single carriage embodiment, and will not be described in detail.

The power for both carriages is provided by the single drive shaft 123. Thus, a single power source enables each of the carriages to be driven, thereby minimizing the number of power sources which must be provided. It is particularly important to note that although a single drive shaft is used to drive both carriages, the positioning of each of the carriages is independent of the positioning of the other. Moreover, although the placement of the carriages on opposite sides of the drive shaft makes an especially compact arrangement, any number of carriages greater than one can be provided along the drive shaft either axially thereof or on opposite sides as shown. The only limitation is with respect to the amount of power which can be transmitted through the drive shaft 123, and the complexity which might be associated with the driving of numerous carriages from a single drive shaft. Also, the particular mechanism being transported by each of the carriages is not limited. For example, one carriage could be translationally moving a transfer head as aforesaid, while the other might be providing movement of a printing head in a data read-out terminal.

From the above description of preferred embodiments, it will be seen that the disc data storage drive apparatus of the invention includes many features which are new and useful. Moreover, certain of the features are useful in other environments in which a linear actuator is desired, e.g., printers for data readout. It is therefore intended that the coverage afforded applicant be limited only by the terms of the claims and equivalent language. In this connection the terminology "position sensor" is meant to include, of course, the electronics which would separate position information from other data recorded on a record surface, as well as the separate transducer mechanism of the preferred embodiment.

We claim:

1. A random access memory apparatus comprising:

A. a rotating magnetic recording disc for data storage;

B. a data transfer head for interaction with a record surface of said disc;

C. a linear actuator for moving said transfer head across the record surface of said disc between radially spaced address locations; said linear actuator comprising:

1. a carriage on which said transfer head is mounted;
2. a track on which said carriage is mounted for travel on a path providing movement of said transfer head between said radially spaced address locations;
3. a drive shaft having a cylindrical surface;
4. a support mounting said driveshaft for rotation thereof about the axis of said cylindrical surface and with said axis of said cylindrical surface generally parallel to said path;
5. power means connected to said driveshaft for rotating the same about said axis of said cylindrical surface;
6. coupling means for converting rotary motion of said driveshaft into translational motion of said carriage, said coupling means including:
   (a) a roller;
   (b) means carried by said carriage for supporting said roller and maintaining the same in frictional engagement with said cylindrical surface of said driveshaft to be driven into rotation thereby; and
   (c) roller control means for selectively changing the angular orientation of the axis of rotation of said roller between an orientation parallel to the axis of rotation of said cylindrical surface and one oblique with respect thereto in which rotation of said driveshaft causes motion of said roller and hence of said carriage along said path to provide said movement of said transfer head between said address locations on said record surface;

D. a position sensor for determining the position at any given time of said transfer head relative to a desired address location; and E. a position servo control responsive to said position sensor indicating a difference between the position of said head and a desired address location by regulating said roller control means to change the angular orientation of said axis of rotation of said roller to one resulting in motion of said carriage in a direction moving said head to said desired address location.

2. The random access memory apparatus of claim 1 wherein said magnetic recording disc is axially mounted on a drive spindle for rotation and said drive shaft is connected to said spindle for rotating the same whereby said driveshaft transmits power for both movement of said carriage and rotation of said disc.

3. The random access memory apparatus of claim 1 further including means for taking up play between said drive shaft and the support therefor and between said roller and said carriage in the direction of said path to thereby prevent unintended motion of said carriage along to said path.

4. The random access memory apparatus of claim 3 wherein said means for taking up play includes resilient spring means urging said driveshaft and said roller in a direction along said path with a force greater than the component of the frictional force between said cylindrical surface and said roller extending along said path.

5. The random access memory apparatus of claim 4 wherein said driveshaft is journalled within bearings held by said support for said rotation about its axis of rotation, and said spring means for taking up play includes a compression spring which is compressed in the direction of said axis between the driveshaft and the support to resiliently urge said driveshaft in said direction with respect to said path.

6. The random access memory apparatus of claim 4 wherein said means carried by said carriage for maintaining said roller in frictional engagement with said cylindrical surface of said driveshaft includes a yoke having an axle extending between its legs upon which said roller is mounted for rotation, and a support rod for said yoke journalled for rotation with respect to said carriage about an axis passing through the center of rotation of said roller; and said means for taking up play includes a leaf spring mounted on said carriage bearing against said yoke to resiliently urge the same along said path with a force greater than the component of the frictional force between said roller and said cylindrical surface along said path.

7. The random access memory apparatus of claim 6 wherein means are provided for preventing axial movement of said roller with respect to said yoke along said path.

8. The random access memory apparatus of claim 7 wherein said means for preventing axial movement of said roller with respect to said yoke includes a duplexed pair of ballbearings which are clamped together to prevent axial motion between said roller and said axle therefor extending between said yoke legs.

9. The random access memory apparatus of claim 1 further including means for preventing travel of said carriage along said path beyond a predetermined limit.

10. The random access memory apparatus of claim 9 wherein said means for preventing travel of said carriage along said path beyond a predetermined limit includes a lever arm which travels with said roller and a stop in the path of said lever arm for engaging said lever arm upon said roller approaching a position representing said carriage limit to pivot said axis of rotation of said roller toward said orientation parallel to the axis of rotation of said cylindrical surface to thereby arrest said motion of said roller and hence of said carriage.

11. The random access memory apparatus of claim 1 wherein said apparatus includes a second magnetic recording disc for data storage, and said linear actuator further includes a second carriage on which a data transfer head is mounted for travel on a path providing movement of said transfer head between radially spaced address locations on a record surface of said second disc; said coupling means further including:

A. a second roller, and

B. means carried by said second carriage for supporting said second roller and maintaining the same in frictional engagement with said cylindrical surface of said driveshaft to be driven into rotation thereby, whereby said driveshaft provides motive power for motion of both of said carriages.

12. The random access memory apparatus of claim 11 wherein said rollers engage said driveshaft on generally opposite sides of the axis of rotation of said cylindrical surface.

13. The random access memory apparatus of claim 11 further including means for taking up play between said drive shaft and the support therefor and between said rollers and their respective carriages in the direction of said paths therefor to thereby prevent unintended motion of said carriages along said paths.

14. The random access memory apparatus of claim 11 further including means for preventing travel of said carriages along their respective paths beyond predetermined limits, said means including for each of said carriages, a lever arm which travels with the roller associated therewith and a stop in the path of said lever arm for engaging the same upon said carriage approaching a position representing said carriage limit to pivot said axis of rotation of said roller toward said orientation parallel to the axis of rotation of said cylindrical surface to thereby arrest said motion of said roller and hence of the carriage with which it is associated.

15. The random access memory apparatus of claim 11 wherein said first and second roller control means each includes a lever arm secured to its associated roller having means spaced from said roller for generating a first magnetic field, means for generating a second magnetic field along the path traveled by said first magnetic means with said lever arm, the interaction of said magnetic fields applying sufficient force to said lever to pivot the same and thereby change the angle of orientation of the axis of rotation of its associated roller; and means are provided for changing the direction of one of said first and second magnetic fields of each of said roller control means relative to the other to correspondingly change the direction of the force applied to said lever of each by the interaction of said magnetic fields.

16. The random access memory apparatus of claim [11] *1*, wherein *said apparatus includes a second magnetic recording disk for data storage, and said linear actuator further includes a second carriage on which a data transfer head is mounted for travel on a path providing movement of said transfer head between radially spaced address locations on a record surface of said second disk; said coupling means further including:*

*A. a second roller;*

*B. means carried by said second carriage for supporting said second roller and maintaining the same in frictional engagement with said cylindrical surface of said driveshaft to be driven into rotation thereby, whereby said driveshaft provides motive power for motion of both of said carriages; and*

*C.* second roller control means [are provided] for selectively changing the angular orientation of the axis of rotation of said second roller independently of changes in the angular orientation of the axis of rotation of said first roller.

17. The random access memory apparatus of claim 16 further including a position sensor for determining the position at any given time of said data transfer head of said second carriage relative to a desired address location; and a position servo control responsive to said position sensor for said data transfer head of said second carriage indicating a difference between the position of said head and the desired address location by regulating said roller control means for said roller associated with said second carriage to change the angular orientation of said axis of rotation of said roller to one resulting in motion of said second carriage in a direction moving said head to said desired address location.

18. The random access memory apparatus of claim 17 wherein said roller control means associated with each of said rollers for selectively changing the angular orientation of the axis of rotation of the respective rollers includes for each of said rollers an induction coil for generating a magnetic field to interact with another magnetic field for the development of a force to change said angular orientation of said axis of rotation; and said position servo control associated with each position sensor is first responsive to said position sensor indicating a position difference by first generating an information signal indicative of such position difference, and includes a power drive circuit for energizing said induction coil associated with its respective lever arm in response to receipt of said information signal, said power drive circuit including a power source connected to said induction coil through a first switching means responsive to receipt of a control signal by applying power from said power source to said coil, second switching means responsive to receipt of said information signal by generating a pulse control signal for application to said first switching means to alternately switch on and off the application of power from said source to said coil, the time delay between pulses of said pulse control signal being selected to be shorter than the decay time for current in said coil, and means for continuing current flow through said coil between said pulses whereby said coil remains energized during the duration of said information signal even though said first switching means is discontinuously operated during such duration.

19. The random access memory apparatus of claim 1 wherein said roller controller means for selectively changing the annular orientation of the axis of rotation of said roller includes an induction coil for generating a magnetic field to interact with another magnetic field for the development of a force to change said angular orientation of said axis of rotation; and said position servo control is first responsive to said position sensor indicating a position difference by first generating an information signal indicative of said position difference, and includes a power drive circuit for energizing said induction coil in response to receipt of said information signal, said power drive circuit including a power source connected to said induction coil through a first switching means responsive to receipt of a control signal by applying power from said power source to said coil, second switching means responsive to receipt of said information signal by generating a pulse control signal for application to said first switching means to alternately switch ON and OFF the application of power from said source to said coil, the time delay between pulses of said pulse control signal being selected to be shorter than the decay time for current in said coil, and means for continuing current flow through said coil between said pulses whereby said coil remains energized during the duration of said information signal even though said first switching means is discontinuously operated during such duration.

20. The random access memory apparatus of claim 19 wherein said first switching means is a transistor driver connected between said power source and said induction coil, and said control signal is received by the base of said driver.

21. The random access memory apparatus of claim 20 wherein said second switching means includes a high gain operational amplifier which receives said information signal on a primary input terminal thereof and the output of which is connected to said base of said transistor driver, and said induction coil is connected in series in a feedback connection of said amplifier for development of said pulse control signals and the discontinuous application by said transistor driver of said power to said coil during an information signal.

22. The random access memory apparatus of claim 21 wherein means are included in said feedback connection for setting the repetition rate at which said amplifier provides said pulses of said control signal.

23. The random access memory apparatus of claim 1 wherein said track includes a guiderail defining said translational path and said carriage is slidably mounted on said guiderail for said travel on said translational path.

24. The random access memory apparatus of claim 23 wherein said carriage is received on said guiderail for translational motion with respect thereto, at positions spaced a substantial distance from one another along the direction of said path to provide stability, and said roller is carried by said carriage at a location spaced transversely from said rail; said track further including a transverse restraint rail positioned on the side of said carriage opposite that on which said roller is provided; and said means for maintaining said roller in frictional engagement with said cylindrical surface of said driveshaft includes spring means resiliently urging said roller away from the remainder of said carriage into engagement with said cylindrical surface and also urge said carriage pivotally about said guiderail into engagement with said cylindrical surface and also urge said carriage pivotally about said guiderail into engagement with said transverse restraint rail.

25. The random access memory apparatus of claim 1 wherein said roller control means includes a lever arm secured to said roller having means spaced from said roller for generating a first magnetic field, means for generating a second magnetic field along the path traveled by said first magnetic means with said lever arm, the interaction of said magnetic fields applying sufficient force to said lever to pivot the same and thereby change the angle of orientation of the axis of rotation of said roller; and means are provided for changing the direction of one of said first and second magnetic fields relative to the other to correspondingly change the direction of the force applied to said lever by the interaction of said magnetic fields.

26. The random access memory apparatus of claim 25 wherein said means on said lever spaced from said roller for generating said first magnetic field includes an electrical coil, and said means for changing the direction of one of said first and second magnetic fields relative to the other includes a power drive circuit for selectively energizing said coil in opposite electrical directions.

27. The random access memory apparatus of claim 25 wherein said lever is secured to said roller for travel with said carriage and further including means for preventing travel of said carriage along said path beyond predetermined limits comprising a pair of opposed stops positioned in the path of said lever arm for engaging the same upon said carriage approaching spaced positions representing said predetermined limits for said carriage to pivot said axis of rotation of said roller toward said orientation parallel to the axis of rotation of said cylindrical surface to thereby arrest said translational motion of said roller and hence of said carriage.

*28. A random access memory apparatus comprising:*

*(a) a rotating magnetic recording disc for data storage;*

*(b) a data transfer head for interaction with a record surface of said disc;*

*(c) a linear actuator for moving said transfer head across the record surface of said disc between radially spaced address locations; said linear actuator comprising:*

*(1) a carriage on which said transfer head is mounted;*

*(2) a track on which said carriage is mounted for travel on a path providing movement of said transfer head between said radially spaced address locations;*

*(3) a drive shaft having a cylindrical surface;*

*(4) a support mounting said drive shaft for rotation thereof about the axis of said cylindrical surface and with said axis of said cylindrical surface generally parallel to said path;*

*(5) power means connected to said drive shaft for rotating the same about said axis of said cylindrical surface;*

*(6) coupling means for converting rotary motion of said drive shaft into translational motion of said carriage, said coupling means including a roller, means carried by said carriage for supporting said roller and maintaining the same in frictional en-*

*gagement with said cylindrical surface of said drive shaft to be driven into rotation thereby, and roller control means for selectively changing the angular orientation of the axis of rotation of said roller between an orientation parallel to the axis of rotation of said cylindrical surface and one oblique with respect thereto in which rotation of said drive shaft causes motion of said roller and hence of said carriage along said path to provide same movement of said transfer head between said address locations on said record surface; and*

*(d) means responsive to a difference between the actual position of said head and a desired address location for regulating said roller control means to change the angular orientation of said axis of rotation of said roller to one resulting in motion of said carriage in a direction moving said head to said desired address location.*

*29. A disk drive comprising:*

*a support frame;*

*a magnetic recording disk mounted to said support frame for rotation about its axis;*

*at least one electromagnetic head mounted to a carriage and positionable relative to said magnetic recording disk by movement of said carriage along a predefined path; and*

*a linear actuator for selectively moving said carriage relative to said support frame along said predefined linear path, said linear actuator comprising a drive shaft having a cylindrical surface, means for rotatably mounting said drive shaft to said frame for rotation of said drive shaft about the axis of said cylindrical surface, means coupled to said drive shaft for rotating said drive shaft about said axis, a roller, means for mounting said roller to said carriage with said roller being rotatable about a first axis and pivotable about a second axis perpendicular to said first axis, means for mounting said carriage to said support frame with said carriage being movable relative to said support frame along said predefined linear path and with said roller being in frictional engagement with the cylindrical surface of said drive shaft whereby said roller is caused to rotate about said first axis by rotation of said drive shaft when said first axis is parallel to the axis of the drive shaft and is additionally caused to move along said predefined linear path during rotation of said drive shaft when said first axis is oblique to the axis of said drive shaft, and means for controllably pivoting said roller about said second axis to control movement of said roller and thus said carriage along said predefined linear path during rotation of said drive shaft.*

*30. A disk drive comprising:*

*a support frame;*

*a magnetic recording disk mounted to said support frame for rotation about its axis;*

*at least one electromagnetic head mounted to a carriage and positionable relative to said magnetic recording disk by movement of said carriage along a predefined path; and*

*a linear actuator for selectively moving said carriage relative to said support frame along said predefined linear path, said linear actuator comprising a shaft having a cylindrical surface, means for rotatably mounting said shaft to a first predetermined one of said frame and said carriage for rotation of said shaft about a first axis, a roller, means for mounting said roller to a second predetermined one of said frame and said carriage with said roller being rotatable about a first axis and pivotable about a second axis perpendicular to said first axis, drive means coupled to a predetermined one of said shaft and said roller for rotating same about its first axis, means for mounting said carriage to said support frame with said carriage being movable relative to said support frame along said predefined linear path and with said roller being in frictional engagement with the cylindrical surface of said shaft, and means for controllably pivoting said roller about its second axis to control movement of said carriage along said predefined linear path during rotation of said shaft and said roller about their first axis.*

* * * * *